United States Patent [19]

Adams

[11] Patent Number: 4,734,027
[45] Date of Patent: Mar. 29, 1988

[54] MOLD FOR INJECTION MOLDING OF SUCTION CUPS

[75] Inventor: William E. Adams, Portersville, Pa.
[73] Assignee: Adams Mfg., Portersville, Pa.
[21] Appl. No.: 59,621
[22] Filed: Jun. 8, 1987
[51] Int. Cl.$^4$ .............................................. B29C 45/40
[52] U.S. Cl. .............................. 425/556; 264/297.2;
    264/328.8; 264/334; 425/572; 425/588
[58] Field of Search ............... 425/556, 572, 588, 554;
    264/328.8, 297.2, 334

[56] References Cited

U.S. PATENT DOCUMENTS

| | | | |
|---|---|---|---|
| 2,531,888 | 11/1950 | Nye et al. | 425/553 |
| 3,331,904 | 7/1967 | Friedman | 264/108 |
| 4,540,534 | 9/1985 | Grendol | 264/2.2 |
| 4,647,275 | 3/1987 | Lundquist | 425/554 |

Primary Examiner—Jay H. Woo
Assistant Examiner—Timothy W. Heitbrink
Attorney, Agent, or Firm—Buell, Ziesenheim, Beck & Alstadt

[57] ABSTRACT

An improved mold for injection molding suction cups is disclosed. Conventionally, plastic is injected through a runner into a mold cavity defined by at least two mold sections having mating faces which can be moved apart to open the mold cavity and the cavity is shaped to define a suction cup having a head and a cup shaped body which body has an outer circumferential edge between its top surface and its bottom surface. The improved mold creates a wedge-shaped tab during molding of the suction cup. The thin part of the tab is adjacent to the outer circumference of the suction cup, One fills the mold cavity by injecting plastic through a gate which is adjacent to the thick part of the tab, said gate having an opening not larger than one half the thickness of the tab, said opening positioned so as not to intersect a face of the mold section. As the molten plastic is injected, turbulence is kept in the wedge-shaped tab area from which it flows more smoothly into the cup itself, keeping the concave inner surface smooth when the cup is cooled. The suction cup is ejected from the mold cavity in a manner to cause the tab to break cleanly from plastic in the gate, without putting stress or causing distortion to the soft plastic in the cooling cup.

6 Claims, 7 Drawing Figures

MOLD FOR INJECTION MOLDING OF SUCTION CUPS

FIELD OF THE INVENTION

The invention relates to a mold and method for injection molding suction cups.

BACKGROUND OF THE INVENTION

Injection molding processes commonly involve the use of two or more dies which fit together to define at least one enclosed space. This space or cavity has a shape of the article to be molded. When small articles are manufactured there are usually several cavities in a single mold which are connected by passageways or runners through which molten plastic can flow into the mold cavities. Plastic material is injected into the mold and runs along the runners in the mold cavities. Sometimes gates are provided through which plastic flows into and fills the cavities. After the molded resin has cooled sufficiently, the mold halves are separated and the articles are removed from the cavities. Normally, plastic has remained in the runners and cooled to form arms which interconnect the molded workpieces. As the molded articles are removed from the cavities they remain connected by the plastic arms. They must then be broken away from these arms. The separation process is a manual operation done either at the factory or by the purchaser. When such manual separation is a part of the manufacturing process it increases the costs of manufacture. Another problem that may occur during this separation process is that a tear or ragged projection may form in the article at the broken connection between an arm and the workpiece. These defects can only be manually removed.

Suction cups conventionally have a convex surface which is placed against a flat surface to which the suction cup is to be attached. The suction cup is sufficiently pliable so that it can be pressed against the flat surface. This causes the concave surface to deform and flatten against the flat surface. Since the suction cup is made of a resilient material, it attempts to return to its original shape. This creates a small vacuum between the suction cup and flat surface; the vacuum holds the suction cup in place. Any depressions which may exist in the concave surface will cause air pockets to be formed between the suction cup and flat surface when the suction cup has been pressed against it. These air pockets reduce the adhesion between the suction cup and flat surface. Then, less force is required to remove the suction cup from the flat surface. This means that a suction cup having such irregularities in its concave surface will not hold as well.

It is well-known that plastic shrinks when it cools. Thus, one must anticipate some shrinkage in the molding of any plastic product. The prior art has manufactured suction cups by injection molding in which the plastic was injected through gates adjacent to the top surface of the cup portion of the suction cup. I have found that when suction cups are molded in this way a depression will occur in the concave surface. This depression reduces the holding ability of the suction cup for the reasons just described. Consequently, there is a need for an injection molding process for suction cups which compensates for plastic shrinkage without reducing the holding power of the suction cup.

By injecting plastic into the top or head of the suction cup, one could avoid the problems caused by injecting plastic into the cup portion of the cup. However, this method is slow and extremely expensive. A longer runner system is needed which causes excessive waste. Of course, one could reduce the waste by using a heated runner system that keeps the plastic in a molten condition. But, heated runner systems are expensive and may easily burn soft plastic, leaving dirt in the cups.

SUMMARY OF THE INVENTION

I provide a mold and method for molding suction cups in which plastic is injected through a gate into each suction cup mold cavity. Each cavity has a small slot between the gate and the main mold cavity. This slot is positioned so as to create a tab at the circumference of the suction cup when filled with plastic. The plastic in this tab separates the gate from the suction cup so that the suction cup itself does not distort as it cools. As a consequence, there will be no deformities or depressions in the concave bearing surface of the suction cup. The gate is sized and positioned so as to have an opening into the tab which is below the face of the mold half. The opening in the gate is not larger than its distance from the the face of the mold. A pin is provided within the mold and positioned so as to be capable of pushing the tab from the mold. Movement of the pin against the tab after the plastic has cooled causes the tab to break away from the plastic in the gate, and does not push against the still warm suction cup, which would be distorted. Consequently, when suction cups are removed from the mold they are not connected by plastic arms. Other objects and advantages of the invention will become apparent as a description of certain present preferred embodiments of the invention proceeds.

DESCRIPTION OF THE PREFERRED EMBODIMENTS

Figure 1:
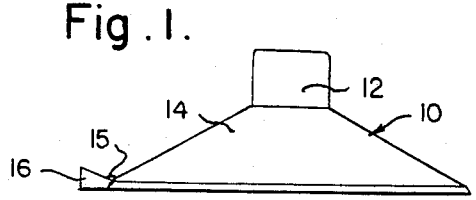
FIG. 1 is a side view of a suction cup made in accordance with the present invention.
Figure 2:
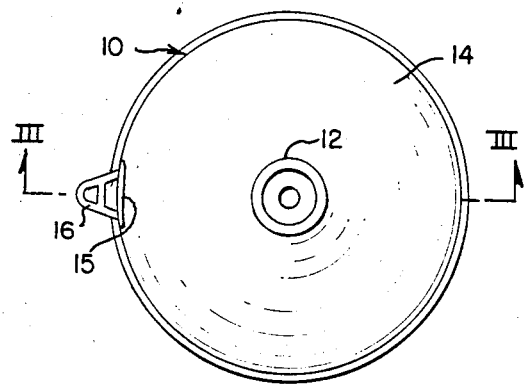
FIG. 2 is a top plan view of the suction cup of FIG. 1.
Figure 3:
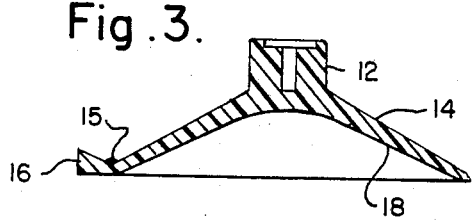
FIG. 3 is a sectional view taken along the line III-—III of FIG. 2.

A suction cup made in accordance with the present invention is shown generally in FIGS. 1, 2 and 3. This suction cup has a cup shaped portion 10 and head 12 attached to the cup shaped portion. There is an upper surface 14 of the cup shaped portion and a bottom concave surface 18 of the cup shaped portion. A tab 16 extends from the outer circumference of the cup shaped portion. I also prefer to provide a shoulder 15 on the upper surface 14 of the cup shaped portion and adjacent to tab 16. This shoulder 15 aids in the flow of plastic into the mold cavity, and is particularly beneficial for small suction cups. When the suction cup made in accordance with the present invention is pressed against a flat surface 21, a portion of concave surface 18 will lie against that flat surface. Since there are no depressions or irregularities in the concave surface 18 there will be no pockets between surface 18, and the flat surface.

Figures 4, 5:
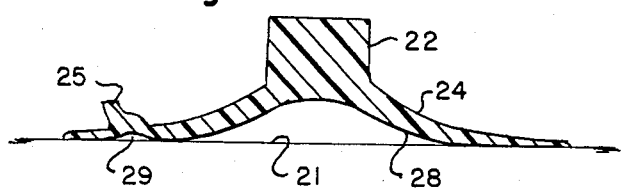
FIG. 4 is a side view of a prior art suction cup.
FIG. 5 is a cross sectional view of the prior art suction cup when the cup is depressed against a flat surface.

In FIG. 4, I have illustrated a prior art suction cup. In FIG. 5, this same prior art suction cup is shown in cross section, pressed against a flat surface 21. This suction cup consists of a cup shaped portion 20 and head 22. There is an upper surface 24 of the cup shaped portion and lower concave surface 28. This prior art suction cup is made by injection molding in which plastic is injected into the mold at a point adjacent to top surface 24. A small projection of plastic 25 extends from the top surface 24 of this prior art suction cup at the point where plastic was injected into the mold. When this suction cup cools during the molding process plastic shrinkage will occur. As a consequence, the concave surface 28 will not be uniform. Instead, there will be a depression in that surface which is opposite the point where plastic was injected into the mold and projection 25 appears. When this suction cup is pressed against a flat surface 21 as shown in FIG. 5, an air pocket 29 will develop. Consequently, adhesion of the suction cup to surface 21 will be reduced.

I have discovered that one can create a uniform concave surface 18 in a suction cup by the provision of tabs 16 and injection of plastic into the mold at a point adjacent to tab 16. As the suction cup cools, no deformities will occur in concave surface 18. Also, there are no variations in the wall thickness over area 14, so that the cup will be able to be seated completely against a surface with no loss of friction against the surface when a downward force is applied.

I prefer to make tab 16 wedge-shaped with the apex or thin edge attached to the outer surface of the suction cup portion 10. During molding the thickest part of the tab will be adjacent to the gate through which plastic is injected into the mold cavity. Turbulence occurs within the plastic as it enters the mold cavity. In my suction cup and mold this turbulence occurs in the wedge-shaped tab away from the cup portion of the product. Consequently, this turbulence does not adversely affect the suction surface of the cup. If the outer circumference of the cup-shaped portion were adjacent to the gate, turbulence of the plastic at the gate will cause slight irregularities to form as the molten plastic hardens during coolng. Around the outer edge of a suction cup 1¾" in diameter there are about four billion atom-sized particles. Irregularities allow atmospheric pressure to force air under the cup. Eventually, the vacuum is destroyed and the cup falls along with whatever may be attached to it. So, prevention of small irregularities in the cup-shaped portion, which my tab does, is of crucial importance. Another advantage of the wedge-shaped tab is that it provides a convenient handle for lifting the suction cup. The thick end is easier to grip than a flat tab or the outer circumference of the cup portion. Additionally, its presence discourages a user from sliding a fingernail under a seated cup and scratching the cup. Such scratches create irregularities which permit air under the cup that eventually destroys the vacuum.

Figure 6:
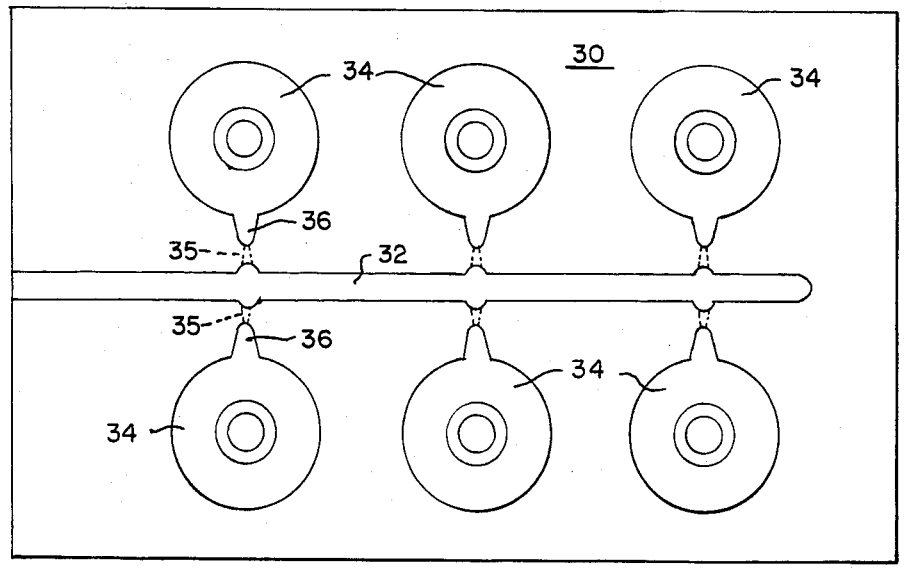
FIG. 6 is a top plan view of the female half of a present preferred embodiment of my mold for practicing my method.
Figure 7:
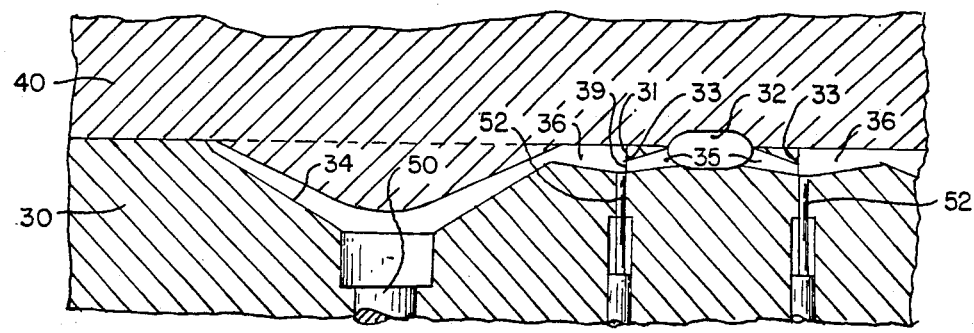
FIG. 7 is a partial sectional view of a cross section through a mold cavity of the female mold half of FIG. 6 with the mating portion of the male half of the mold.

In FIG. 6, I show the female half of a two piece, six cavity mold for making the suction cup of FIGS. 1 thru 3. This mold 30 has a conventional runner 32 which carries plastic to the mold cavities 34. In FIG. 7, I have illustrated a cross section of one mold cavity 34 defined by female mold 30 and male mold 40. As can be seen in FIGS. 6 and 7, I provide a gate 35 which directs plastic from the runner 32 into the slot portion 36 of mold cavity 34. I prefer to provide a frusto conical gate 35 which extends at an angle from the face of mold half 30 as shown in FIG. 7. Slot 36 defines the tab 16 on the suction cup. After the cavity is filled with plastic and allowed to cool, mold halves 30 and 40 are separated. At this point in time, the suction cup and the plastic arms formed by the runner system will be on female mold half 30. As in conventional suction cup molds, a first plunger 50 extends into the head portion of mold cavity 34 pushing the head of the suction cup from the mold. Unlike the prior art, I use a second ejector. At the same time plunger 50 moves into the mold cavity, a second pin 52 pushes into slot 36 against the tab portion of the suction cup. Because the opening 39 of gate 35 is not larger than the surface 31 of the mold against the edge of slot 36, the tab portion of the suction cup will rip from the plastic in gate 35. Moreover, the acute angle formed between gate 35 and surface 31 creates a cutting edge 33 that aids in separating the tab from plastic in gate 35. The combination of a tab and the use of pin 52 allow for automated injection molding of suction cups and avoids the problem of deformities in the concave surface of the mold. It also prevents unsightly plastic projections from appearing on the surface of the suction cup. Since the suction cups are automatically separated from the plastic arms formed by the runner system, substantial labor savings are enjoyed.

While I have described and shown the present preferred embodiment of my invention, it is to be distinctly understood that the invention is not limited thereto, but may be variously embodied within the scope of the following claims.

I claim:

1. An improved mold for injection molding suction cups of the type wherein plastic is injected through a runner into a mold cavity defined by at least two mold sections having mating faces which can be moved apart to open the mold cavity and the cavity is shaped to define a suction cup having a head and a cup shaped body which body has an outer circumferential edge between its top surface and its bottom surface and wherein the improvement comprises
   (a) a slot adjacent to the mold cavity, shaped and positioned to define a tab when plastic is injected into the mold cavity and slot, said tab being attached to the outer circumferential edge of the molded suction cup, and said slot further having a cutting edge,
   (b) a plunger sized and positioned within a mold section so as to be substantially parallel to the cutting edge of the slot, and be able to extend into and retract from the slot and push a tab formed in the slot from the slot, and
   (c) a gate within a mold section through which plastic flows from the runner into the slot and mold cavity, said gate having an opening extending from a cutting edge adjacent to the slot to the runner and said gate being positioned so that the cutting edge is at least as wide as the opening of said gate at said cutting edge.

2. The mold of claim 1 wherein the gate is at an acute angle to the outer wall of the slot.

3. The mold of claim 1 wherein the gate is frusto conical.

4. The mold of claim 1 wherein the gate has a second opening into the runner which opening is adjacent to a face of the mold section.

5. The mold of claim 1 wherein the mold cavity is sized and configured to provide a shoulder on the cup shaped body of a suction cup formed therein, said shoulder being adjacent to the tab.

6. The mold of claim 1 wherein the slot is shaped to define a wedge-shaped cavity having its thickest part adjacent to the outer wall of the slot.

* * * * *